US010525385B2

(12) United States Patent
Bortnik et al.

(10) Patent No.: US 10,525,385 B2
(45) Date of Patent: Jan. 7, 2020

(54) INTANK FILTER BOWL DE-AERATION OUTLET SHROUD AND FILTER BOWL AND FILTER ASSEMBLY INCLUDING THE SAME

(71) Applicant: Schroeder Industries, LLC, Leetsdale, PA (US)

(72) Inventors: Christopher B. Bortnik, Warrendale, PA (US); Jan L. R. Clatty, Moon Township, PA (US); Preston L. Gealy, New Castle, PA (US); Kaleab Habtemariam, Coraopolis, PA (US); Alex J Lippai, West Mifflin, PA (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 305 days.

(21) Appl. No.: 15/290,165

(22) Filed: Oct. 11, 2016

(65) Prior Publication Data

US 2017/0182438 A1  Jun. 29, 2017

Related U.S. Application Data

(63) Continuation of application No. PCT/US2015/025618, filed on Apr. 13, 2015.
(Continued)

(51) Int. Cl.
| B01D 35/027 | (2006.01) |
| B01D 36/00 | (2006.01) |
| B01D 29/15 | (2006.01) |
| F15B 1/26 | (2006.01) |
| F15B 21/044 | (2019.01) |

(52) U.S. Cl.
CPC .......... *B01D 35/0273* (2013.01); *B01D 29/15* (2013.01); *B01D 36/001* (2013.01); *F15B 1/26* (2013.01); *B01D 2201/287* (2013.01); *F15B 21/044* (2013.01)

(58) Field of Classification Search
CPC .. B01D 35/0273; B01D 36/001; B01D 29/15; B01D 2201/287; B01D 35/027; F15B 1/26; F15B 21/044
See application file for complete search history.

(56) References Cited

U.S. PATENT DOCUMENTS

| 4,017,397 | A | * | 4/1977 | Copeland | ............... | B01D 29/21 |
| | | | | | | 210/238 |
| 4,133,763 | A | * | 1/1979 | Cooper | .................. | B01D 29/21 |
| | | | | | | 210/232 |

(Continued)

*Primary Examiner* — Liam Royce
(74) *Attorney, Agent, or Firm* — Blynn L. Shideler; Krisanne Shideler; BLK Law Group

(57) ABSTRACT

An in-tank filter bowl de-aeration shroud for a hydraulic or oil reservoir includes an outlet shroud surrounding the filter bowl outlet at a proximal end thereof and having a shroud fluid outlet at a distal end thereof with a larger opening than an opening of the filter bowl outlet. The outlet shroud may be formed as or include a diverging member surrounding the filter bowl outlet at a proximal end thereof and having a diverging member fluid outlet at a distal end thereof, wherein the member diverges from the proximal end to the distal end thereof. The outlet shroud may further include a central deflector positioned within the diverging member and combining with the diverging member to form an annular passage to the diverging member fluid outlet.

4 Claims, 9 Drawing Sheets

Related U.S. Application Data

(60) Provisional application No. 61/978,256, filed on Apr. 11, 2014.

(56) References Cited

U.S. PATENT DOCUMENTS

| | | |
|---|---|---|
| 6,116,454 A | 9/2000 | Henderson et al. |
| 6,227,221 B1 * | 5/2001 | Schmitz ................. F16D 31/02 137/1 |
| 6,352,645 B1 * | 3/2002 | Wilfong ................. B01D 29/15 210/767 |
| 6,475,380 B1 | 11/2002 | Fangmann et al. |
| 6,508,271 B2 | 1/2003 | Evanovich et al. |
| 7,252,759 B2 | 8/2007 | Evanovich et al. |
| 2009/0218265 A1 * | 9/2009 | Dor ...................... A01K 63/045 210/167.25 |

* cited by examiner

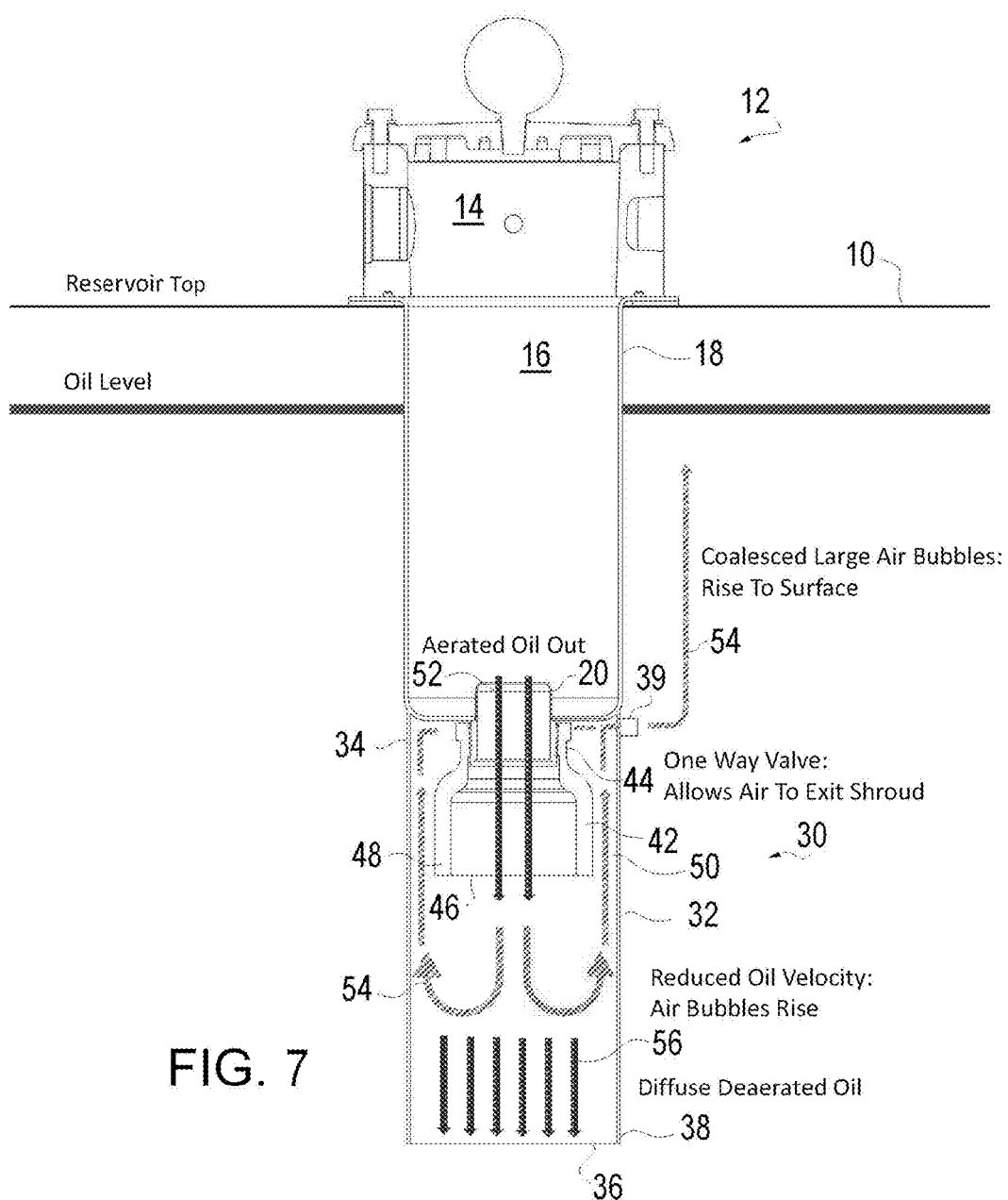

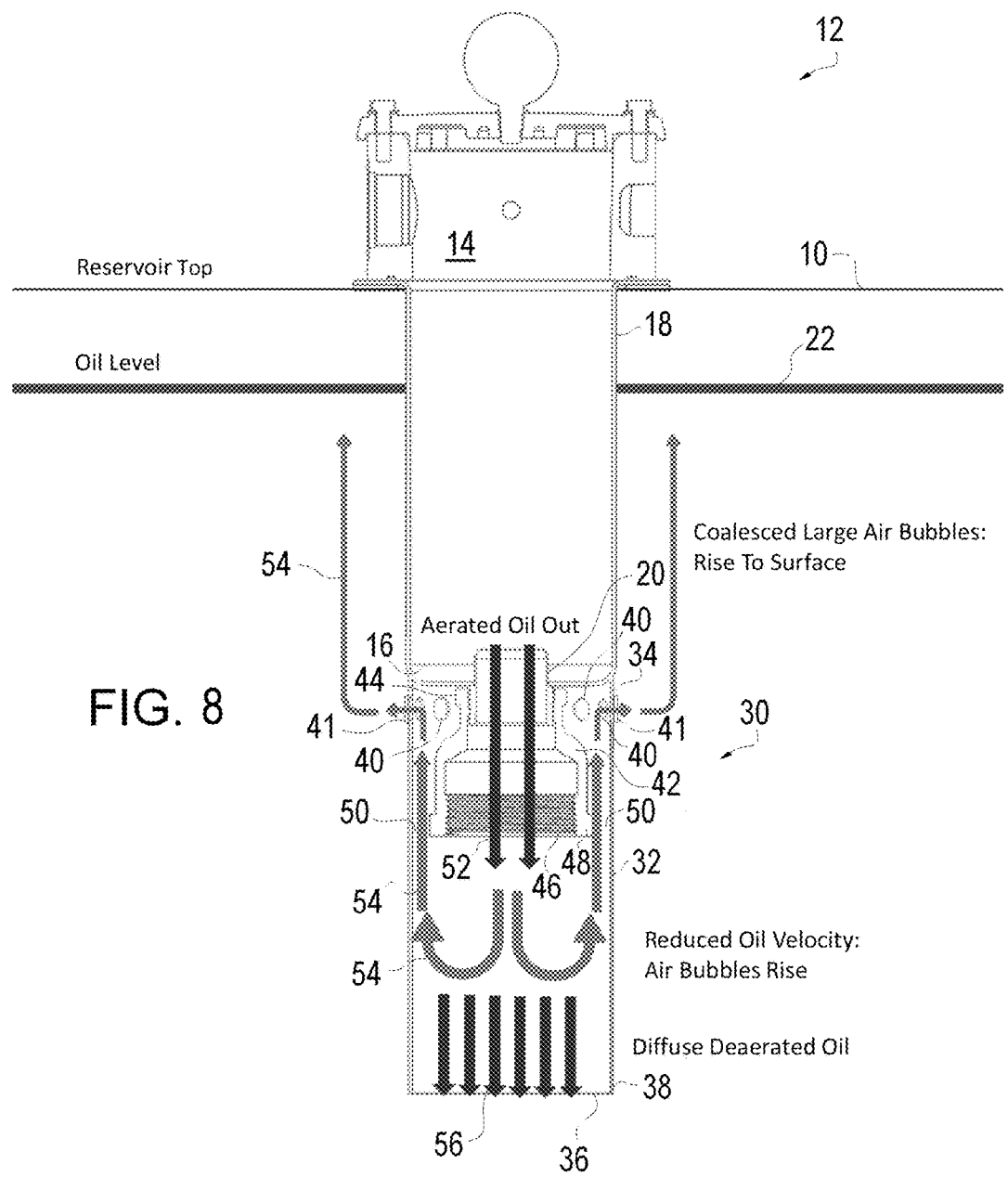

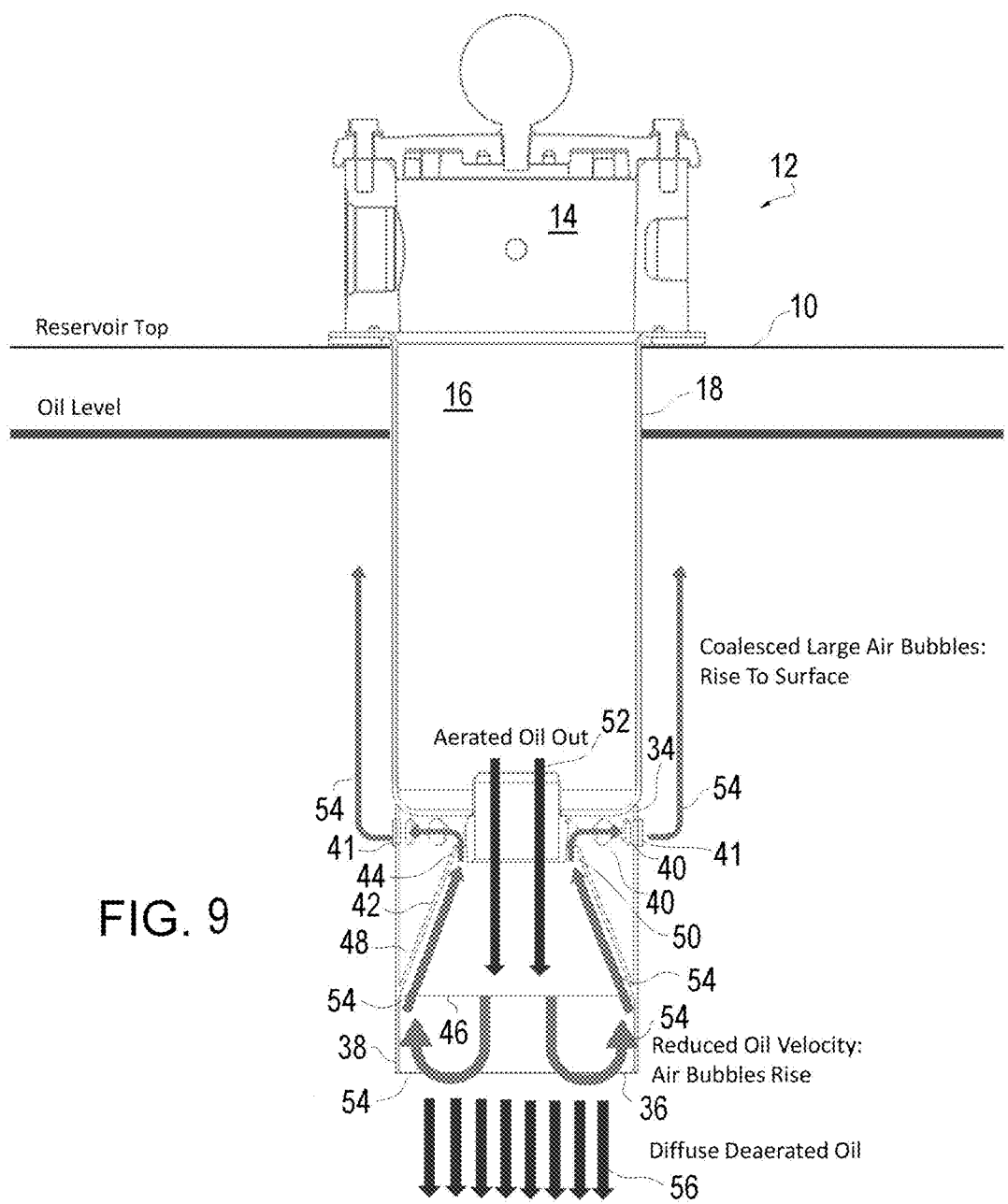

INTANK FILTER BOWL DE-AERATION OUTLET SHROUD AND FILTER BOWL AND FILTER ASSEMBLY INCLUDING THE SAME

RELATED APPLICATIONS

The present application is a continuation of international patent application serial number PCT/US2015/025618 filed Apr. 13, 2015 and which published as WO 2015-157,775 on Oct. 15, 2015, which publication is incorporated herein by reference. International patent application serial number PCT/US2015/025618 claims the benefit of provisional patent application Ser. No. 61/978,256 filed Apr. 11, 2014.

BACKGROUND OF THE INVENTION

1. Field of the Invention

The present invention relates to de-aeration of hydraulic fluid within a reservoir, and more specifically to de-aeration of hydraulic fluid from a return line filter within a reservoir.

2. Background Information

Hydraulic reservoirs are used to hold hydraulic fluid that can be utilized by hydraulic systems, such as used in heavy machinery, including cranes, backhoes, demolition shears, bulldozers, and the like. Within the meaning of this application hydraulic fluid will be inclusive of hydraulic fluid and oil, synthetic oil, bio-fuels, and fuels, which are sometimes collectively referred to as industrial fluids. In hydraulic systems, it is important to keep the hydraulic fluid free of debris. Consequently, filter units or filter assemblies have been incorporated in the hydraulic systems to filter debris from the hydraulic fluid.

U.S. Pat. Nos. 6,116,454; 6,475,380, 6,508,271 and 7,252,759 disclose hydraulic reservoir designs that incorporate specific filter assemblies therein (i.e. in-tank filter elements), and these patents are incorporated herein by reference. The filter elements can be on the outlet lines, as shown in the '454 patent or in the inlet lines as shown in the '380 and '271 patents. A filter element on the outlet or suction side of a hydraulic reservoir is generally a simple strainer. Placing the filter element in the inlet or return lines that extends to the reservoir, as shown in the '271, '380 and '759 patents provides certain advantages relating to the energy required by filtration and returning of the fluid to the reservoir.

The large majority of in-tank filter elements for hydraulic reservoirs utilize a return line filter element of some kind. One known or common example is a forming a partition or separate bowl structure within the hydraulic reservoir and incorporating a top mounted, or drop-in, filter element therein. A similar known configuration is to have the filter element as part of a larger filter assembly with integrated bowl which is "dropped" into the top of the container with the return lines connected directly to the head of the filter assembly. This filter element is also a top mounted structure. The term "top mounted" refers to access or mounting direction in that the filter element is accessed and replaced through the top of the reservoir, such as in the '271 and '759 patents.

Air is detrimental to hydraulic systems because it can cause numerous problems, including Reduced Thermal Conductivity, Higher Oil and Hydraulic Fluid Temperatures, Oil and Hydraulic Fluid Deterioration, Reduced Hydraulic Fluid and Oil Lubricity, Cavitation, Higher Noise Levels, Reduced Bulk Modulus (Increased Compressibility), Reduced Component Efficiency, and Reduced Dielectric Properties.

With new government regulations and other manufacturing pressures, many equipment manufacturers are decreasing hydraulic fluid reservoir sizes to save space & weight. It can be more difficult for air to dissipate from hydraulic fluid with the resulting reduced surface area in the smaller fluid reservoir sizes. Further space restrictions may not allow the reservoir shape itself to be optimized for de-aeration of the fluid.

The prior art fails to adequately provide de-aeration of hydraulic fluid from a filter bowl in a hydraulic fluid reservoir, particularly in a reservoir of reduced size. It is an object of the present invention to overcome the drawbacks of the prior art and to provide an apparatus which de-aerates hydraulic fluid within a reservoir. It is a further object of the present invention to provide a de-aeration design that can be incorporated into the filter bowl and/or the filter assembly design, or alternatively, added as an accessory to an existing filter bowl.

SUMMARY OF THE INVENTION

At least some of the above objectives are achieved by using an in-tank filter bowl de-aeration shroud according to the present invention.

One embodiment of the present invention provides an in-tank filter bowl de-aeration shroud comprising an outlet shroud surrounding the filter bowl outlet at a proximal end thereof and having a shroud fluid outlet at a distal end thereof with a larger opening than an opening of the filter bowl outlet.

The in-tank filter bowl de-aeration shroud according to one embodiment of the invention may provide that the outlet shroud is cylindrical. Further the in-tank filter bowl de-aeration shroud may include a diverging member within the outlet shroud and surrounding the filter bowl outlet at a proximal end thereof and having a diverging member fluid outlet at a distal end thereof, wherein the member diverges from the proximal to the distal ends thereof. Further the in-tank filter bowl de-aeration shroud may include wherein the diverging member has a bowl shape in cross section, and wherein the diverging member fluid outlet is spaced from the shroud fluid outlet.

The in-tank filter bowl de-aeration shroud according to one embodiment of the invention may provide a central deflector positioned within the diverging member and combining with the diverging member to form an annular passage to the shroud fluid outlet.

The in-tank filter bowl de-aeration shroud according one embodiment of the invention may provide that the outlet shroud is formed as a diverging member immediately adjacent the filter bowl outlet at a proximal end thereof and diverging from the proximal end to the distal end thereof, and wherein the diverging member has a conical shape in cross section. The in-tank filter bowl de-aeration shroud according to one embodiment of the invention may further include a central deflector positioned within the diverging outlet shroud and combining with the diverging outlet shroud to form an annular passage to the shroud fluid outlet, wherein the central deflector extends to the filter bowl outlet, and wherein the central deflector has a conical shape in cross section.

One embodiment of the present invention provides an in-tank filter bowl with de-aeration shroud comprising a filter bowl configured to receive a filter element therein and having an outlet at a distal end thereof; and an outlet shroud surrounding the filter bowl outlet at a proximal end thereof and having a shroud fluid outlet at a distal end thereof with a larger opening than an opening of the filter bowl outlet.

One embodiment of the present invention provides an in-tank filter assembly comprising a filter element; a filter bowl configured to receive the filter element therein and having an outlet at a distal end thereof; and a diverging member surrounding the filter bowl outlet at a proximal end thereof and having a diverging member fluid outlet at a distal end thereof, wherein the member diverges from the proximal end to the distal end thereof.

These and other advantages of the present invention will be clarified in the description of the preferred embodiments taken together with the attached figures.

BRIEF DESCRIPTION OF THE DRAWINGS

FIG. 7 is a schematic illustration of an in-tank filter bowl with a de-aeration shroud according to another embodiment of the present invention;

FIG. 8 is a schematic illustration of an in-tank filter bowl with a de-aeration shroud according to another embodiment of the present invention; and FIG. 9 is a schematic illustration of an in-tank filter bowl with a de-aeration shroud according to another embodiment of the present invention.

DESCRIPTION OF THE PREFERRED EMBODIMENTS

Figure 1:
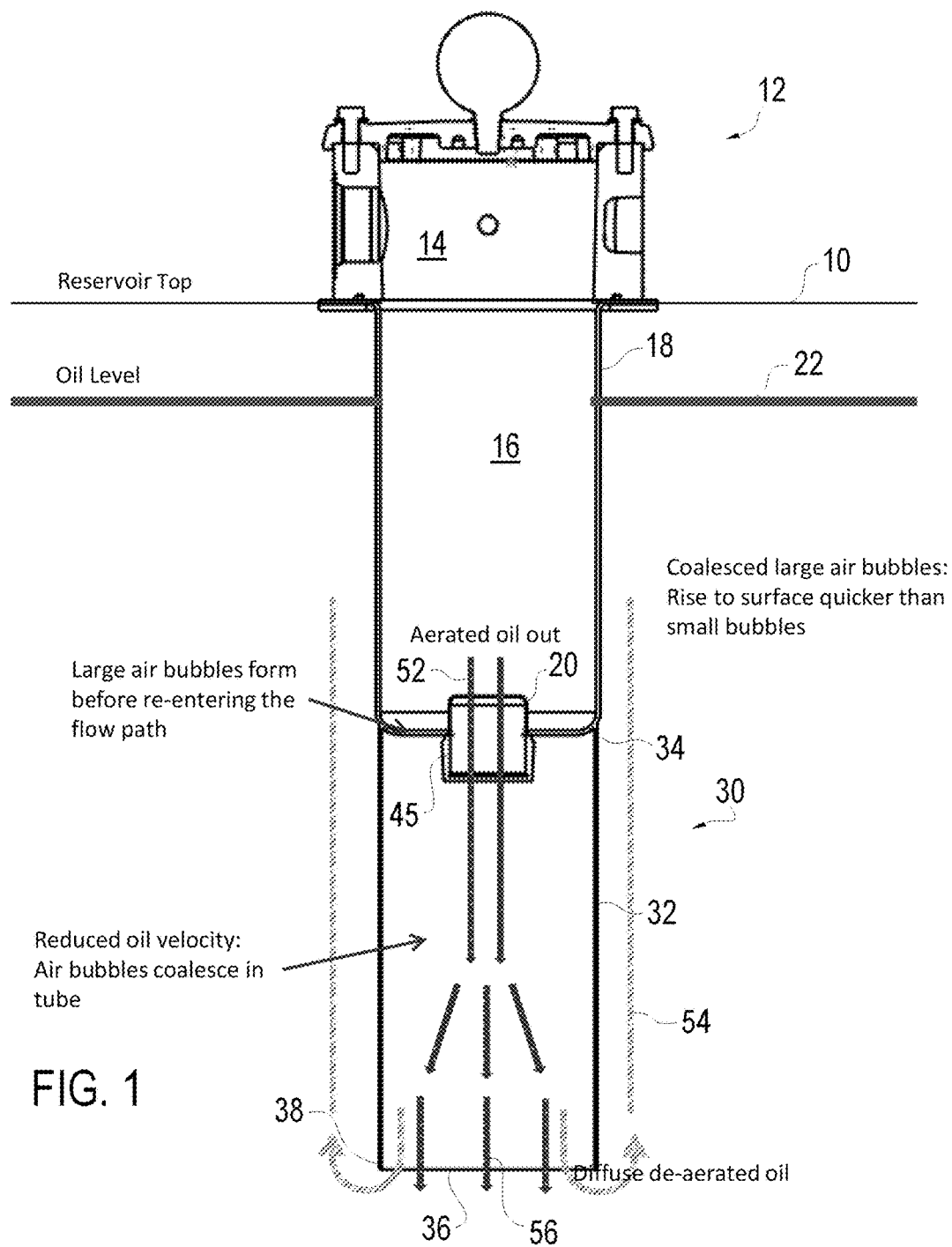
FIG. 1 is a schematic illustration of an in-tank filter bowl with a de-aeration shroud according to one embodiment of the present invention.

The present invention relates to de-aeration of hydraulic fluid within a reservoir 10, and more specifically to de-aeration of hydraulic fluid from a return line filter within the reservoir 10. It is important to note again that within the meaning of this application hydraulic fluid will be inclusive of hydraulic fluid and oil, synthetic oil, bio-fuels, and fuels. The construction of the reservoir 10 is well known in the art and may be formed as a roto-molded structure the specific configuration of which is often determined by the associated environment within which is must be secured. The reservoir includes an inlet through the filter assembly 12, and one or more outlets (not shown). The reservoir 10 may also include conventional elements such as a drain, baffles, mounting features and the like, not shown herein.

The filter assembly 12 includes a top 14 having the inlet and associated line connections, an outside-in "drop in" filter element (or cartridge) 16, a filter bowl 18 configured to receive the filter element 16 therein and includes a filter bowl outlet 20 at a distal end thereof that is below the general fluid level line 22 within the reservoir 10. The filter element 16, such as available from the applicant Schroeder Industries, will typically seal around the outlet opening 20. These aspects of the filter assembly 12 and the reservoir 10 are generally conventional and known in the art and are not discussed further herein.

FIGS. 1-4 and 7-9 are schematic illustrations of the reservoir 10 with an in-tank filter bowl 18 provided with distinct de-aeration shrouds 30 according to distinct embodiments of the present invention.

In the embodiment of FIG. 1 the in-tank filter bowl de-aeration shroud 30 includes a cylindrical outlet shroud 32 surrounding the filter bowl outlet 20 at a proximal end 34 thereof and having a shroud fluid outlet 36 at a distal end 38 thereof. The outlet 36 has a larger opening than an opening of the filter bowl outlet 20. The cylindrical outlet shroud 32 may have a diameter approximate the diameter of the filter bowl 18. The cylindrical outlet shroud 32 may be formed integral with the bowl 18. However the cylindrical outlet shroud 32 may also be coupled to the outlet 20 via a threaded coupling 45. The coupling 45 can be attached to the cylindrical outlet shroud 32 by ribs (not shown) or similar connections.

The shroud 32 can provide directional control of the emission of the diffuse de-aerated fluid 56 into the reservoir 10. This directional control may be used to further accelerate de-aeration of the fluid and may not always be downward as shown in the simple examples of FIGS. 1-4. For example adding a 45 degree or 90 degree (or any desired angle between 0 and 90 degrees) bend to the distal end 38 of the shroud 30 can be used for further directional control (with the shroud 32 being rotated to the desired outlet configuration in a 360 degree arc). The desired direction for the outlet 36 is a function of the particular shape of the reservoir 40.

In operation aerated fluid 52 exits the outlet 20 and decelerate within the cylindrical outlet shroud 32 allowing air bubbles to coalesce in the cylindrical outlet shroud 32. The diffuse de-aerated fluid 56 enters into the reservoir 10 at the outlet 36. Large air bubble will form in the proximal end 34 before re-entering the flow path and exiting the cylindrical outlet shroud 32 and floating to the surface 22 in path 54.

Figure 2:
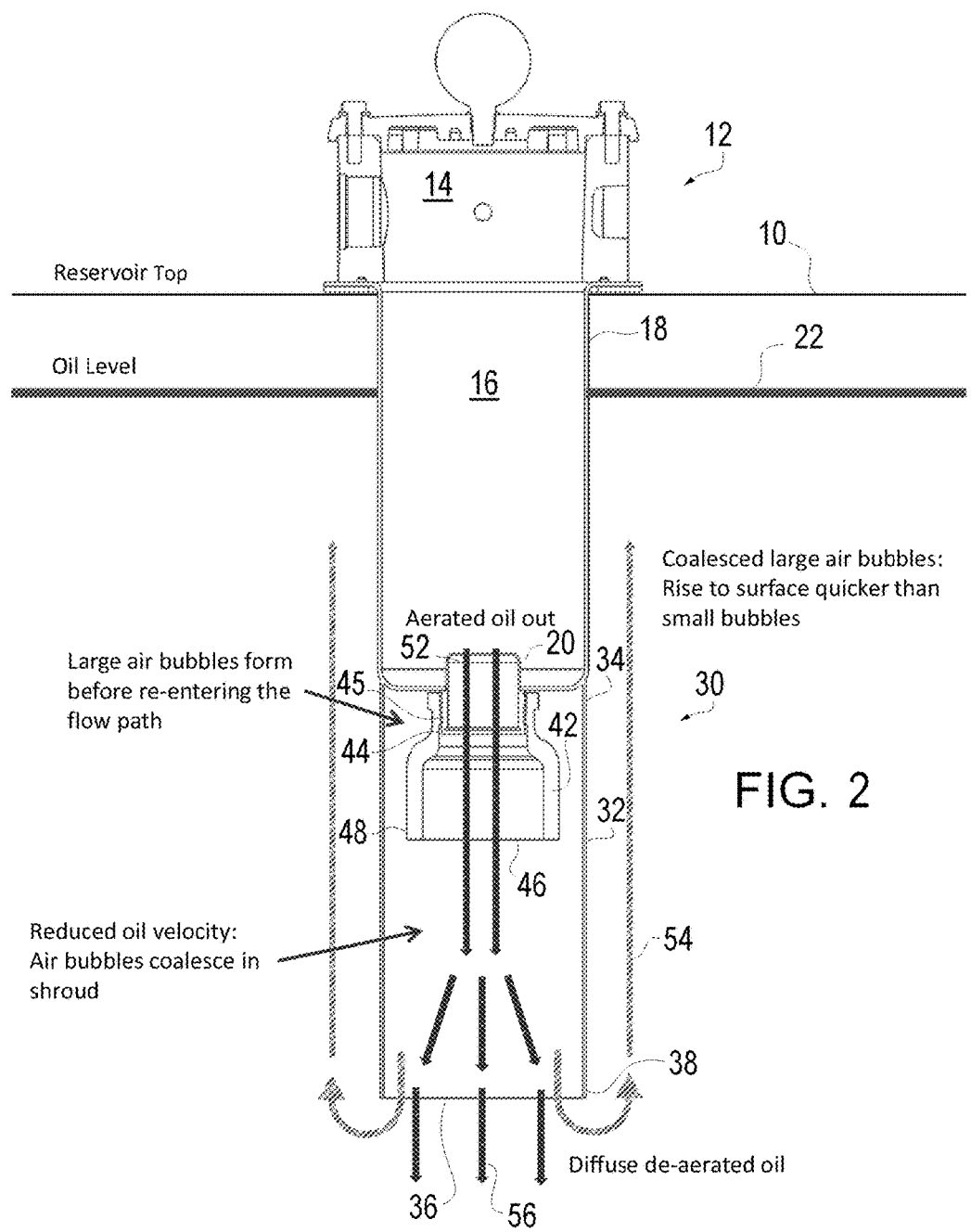
FIG. 2 is a schematic illustration of an in-tank filter bowl with a de-aeration shroud according to another embodiment of the present invention.

In the embodiment of FIG. 2, the shroud 30 further includes a diverging member 42 within the outlet shroud 32 and surrounding the filter bowl outlet 20 at a proximal end 44 thereof and having a diverging member fluid outlet 46 at a distal end 48 thereof, wherein the member 42 diverges from the proximal end 44 to the distal end 48 thereof. In the embodiments of FIG. 2, the diverging member 42 has a bowl shape in cross section, also known as a bell shape. The in-tank filter bowl de-aeration shroud 30 of FIG. 2 the diverging member fluid outlet 46 is spaced from the shroud fluid outlet 36. In operation the shroud 30 of FIG. 2 is substantially the same as FIG. 1, with the diverging member 42 will affect the velocity profile and the re-entering of the air bubbles into the flow path.

Figure 3:
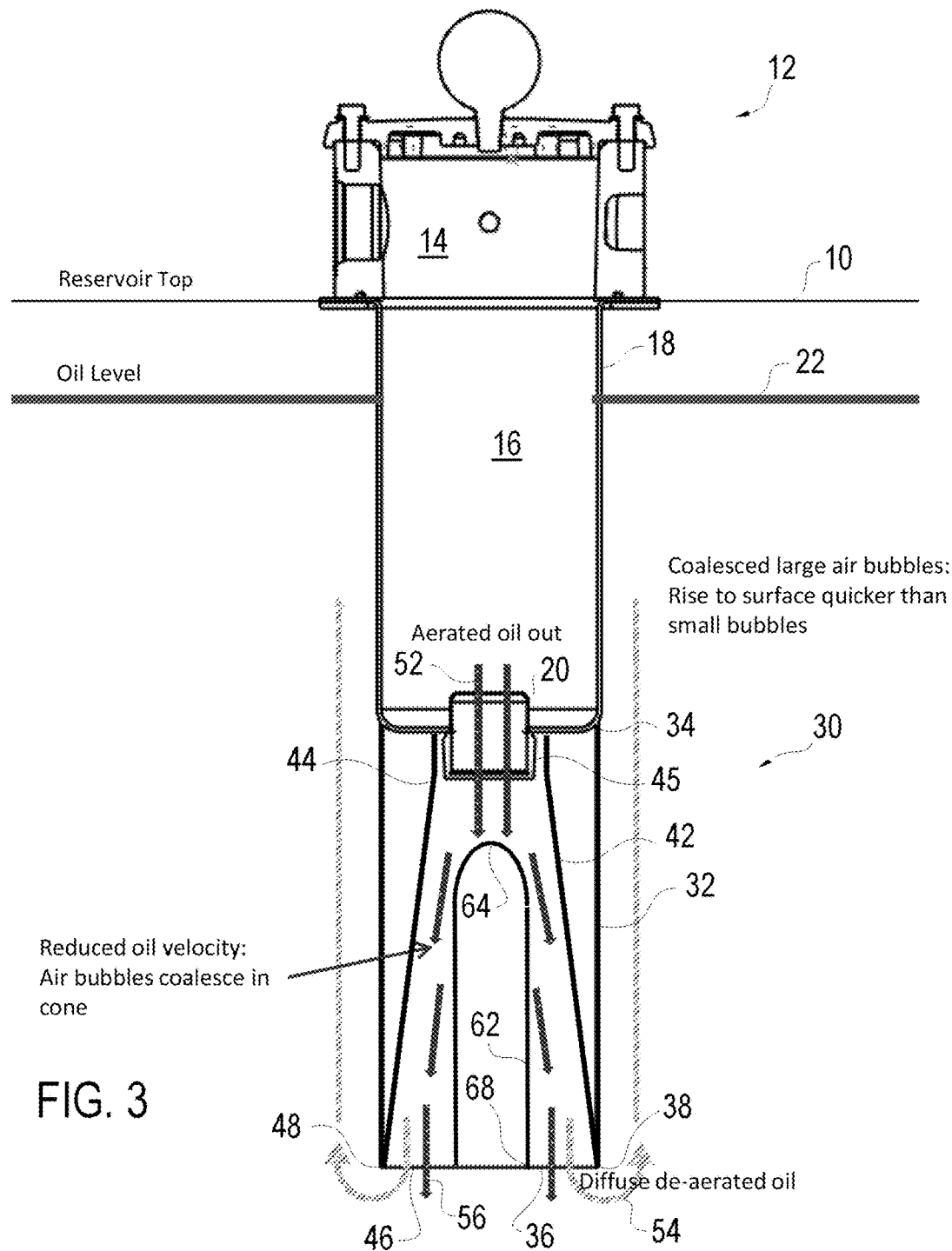
FIG. 3 is a schematic illustration of an in-tank filter bowl with a de-aeration shroud according to another embodiment of the present invention.

In the embodiment of FIG. 3, the shroud 30 further includes a diverging member 42 within the outlet shroud 32 and surrounding the filter bowl outlet 20 at a proximal end 44 thereof and having a diverging member fluid outlet 46 at a distal end 48 thereof, wherein the member 42 diverges from the proximal end 44 to the distal end 48 thereof. In the embodiments of FIG. 3, the diverging member 42 is a conical shape and the diverging member fluid outlet 46 is laterally aligned with the shroud fluid outlet 36 as shown. In the embodiment of FIG. 3, the shroud 30 further includes a central deflector 62 positioned within the diverging member 42 extending from a rounded proximal end 64 to a distal end adjacent the outlets 36 and 46. The central deflector 62 combine with the diverging member 42 from the position of the proximal end 64 to form an annular passage to the shroud fluid outlet 46. The central deflector 62 is shaped to form the annular passage which increases in cross section in the direction toward the shroud fluid outlet 46.

In operation the shroud 30 of FIG. 3 is similar as the shrouds 30 of FIGS. 1-2, with the diverging member 42 designed to control the velocity profile and allow de-aerated fluid 56 to exit and air bubbles to follow separate path 54.

Figure 4:
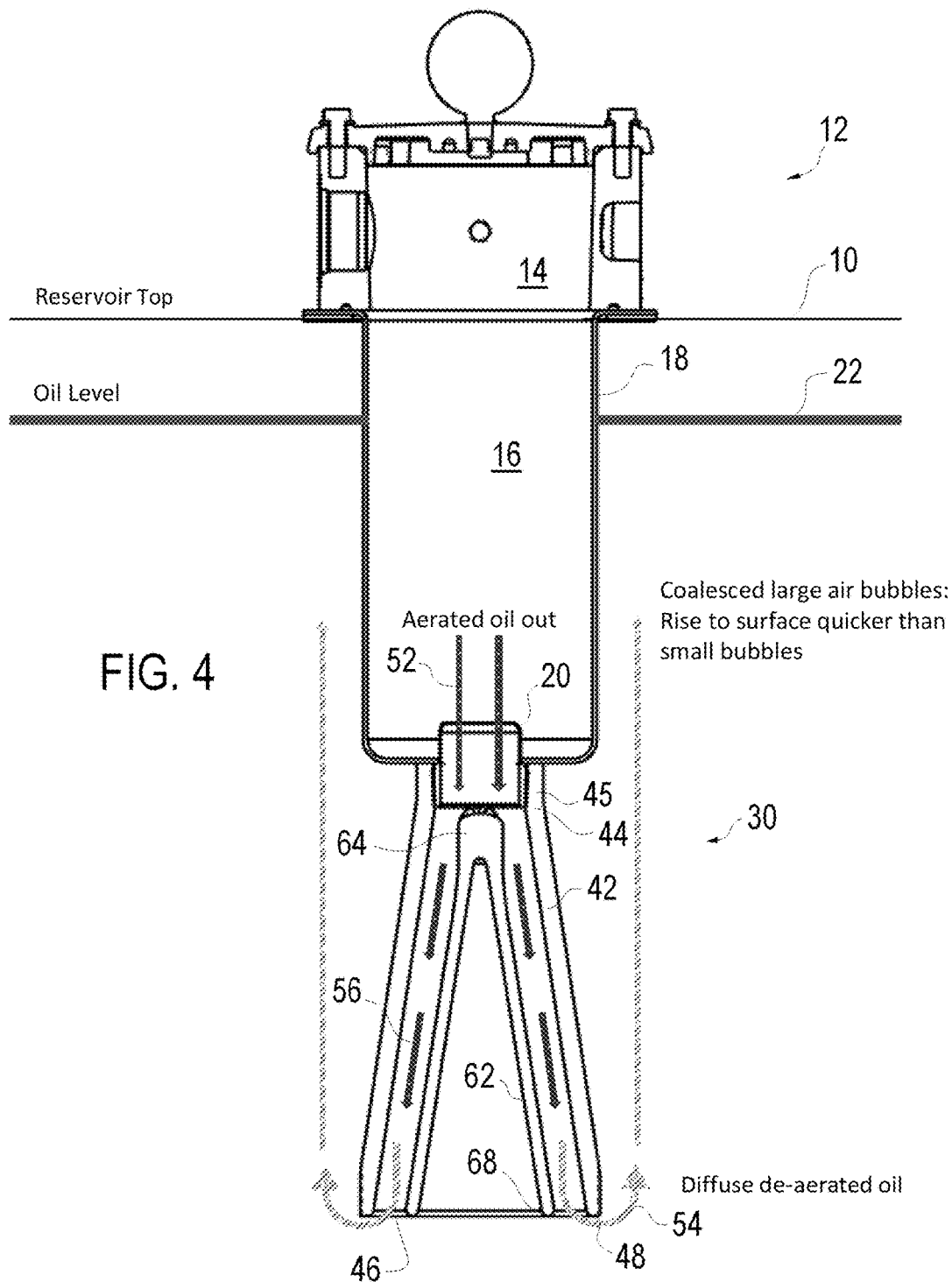
FIG. 4 is a schematic illustration of an in-tank filter bowl with a de-aeration shroud according to another embodiment of the present invention.

The embodiment of FIG. 4 is analogous to the shroud of FIG. 3, wherein the shroud 30 includes a diverging member 42. In the embodiment of FIG. 4 the member 42 serves the function of outlet shroud 32. The diverging member 42 surrounds the filter bowl outlet 20 at a proximal end 44 thereof and has a diverging member fluid outlet 46 at a distal end 48 thereof, wherein the member 42 diverges from the proximal end 44 to the distal end 48 thereof. In the embodiment of FIG. 4, the diverging member 42 is a conical shape and the diverging member fluid outlet 46 is effectively the shroud fluid outlet 36. In the embodiment of FIG. 4, the shroud 30 further includes a central deflector 62 positioned within the diverging member 42 extending from a proximal end 64 to a distal end adjacent the outlets 36 and 46. The central deflector 62 combine with the diverging member 42 from the position of the proximal end 64 to form an annular passage to the shroud fluid outlet 46. The central deflector 62 is conically shaped wherein the central deflector has a conical shape in cross section and the central deflector 62 forms the annular passage which increases in cross section in the direction toward the shroud fluid outlet 46. The central deflector 62 of embodiment 4 has a proximal end 64 which extends to the filter bowl outlet 20.

Figure 5:
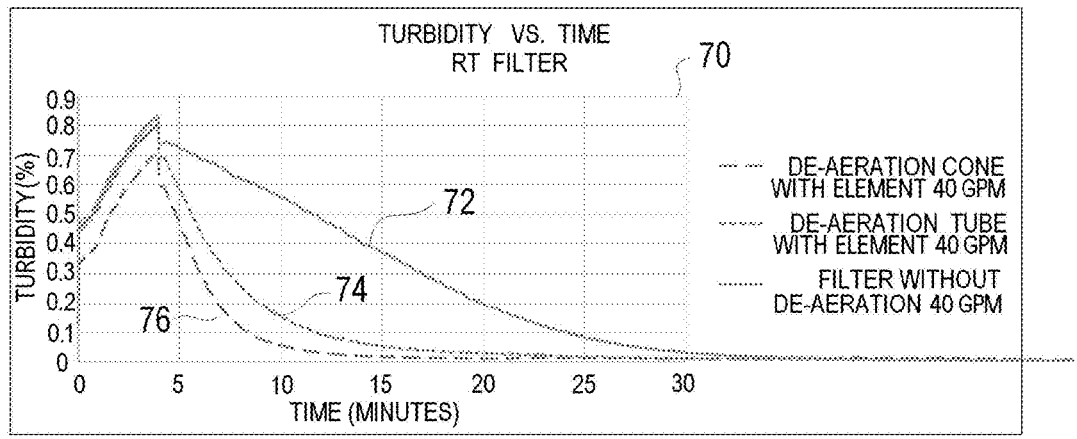
FIG. 5 illustrates experimental results for the present invention.
Figure 6A:
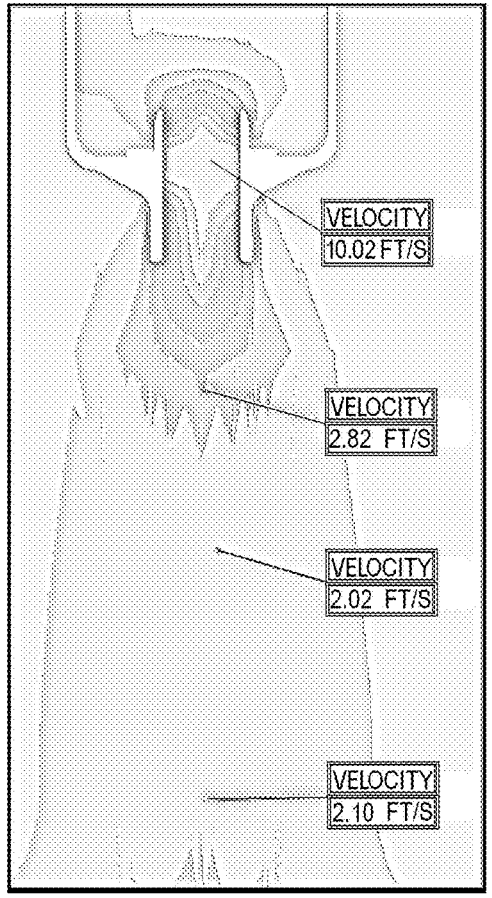
FIGS. 6A and 6B are velocity profile schematics of testing on a prior art in-tank filter bowl.
Figure 6B:
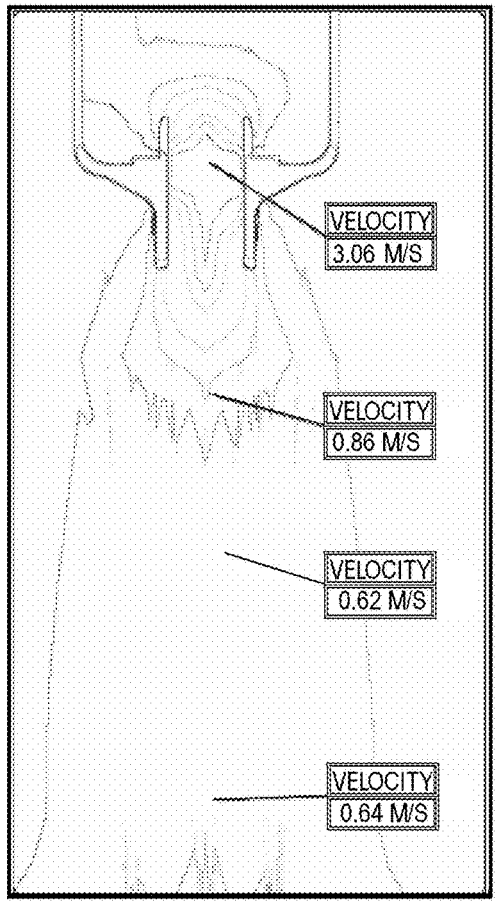
Figure 6C:
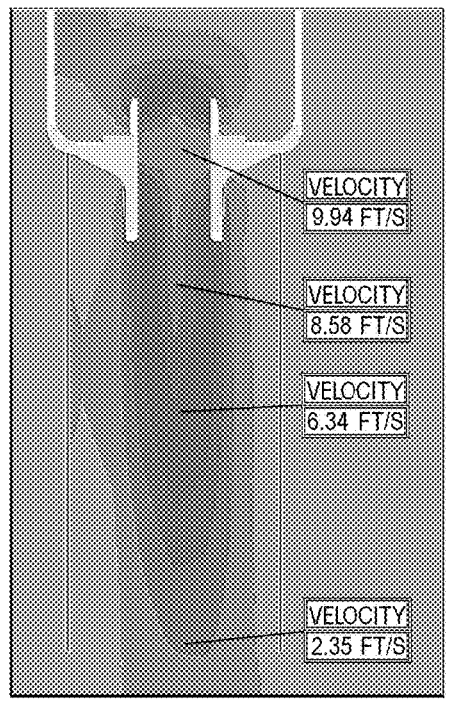
FIGS. 6C and 6D are velocity profile schematics of testing on an in-tank filter bowl with a de-aeration shroud according to FIG. 1.
Figure 6D:
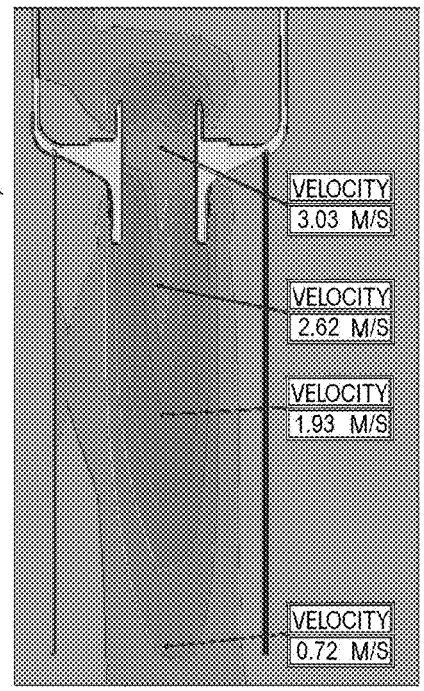
Figure 6E:
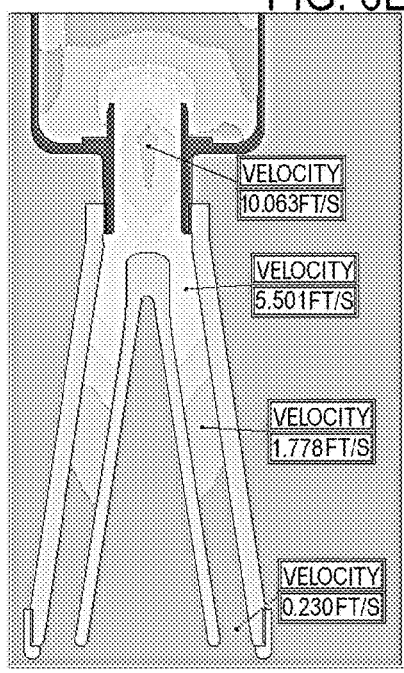
FIGS. 6E and 6F are velocity profile schematics of testing on an in-tank filter bowl with a de-aeration shroud according to FIG. 4.
Figure 6F:
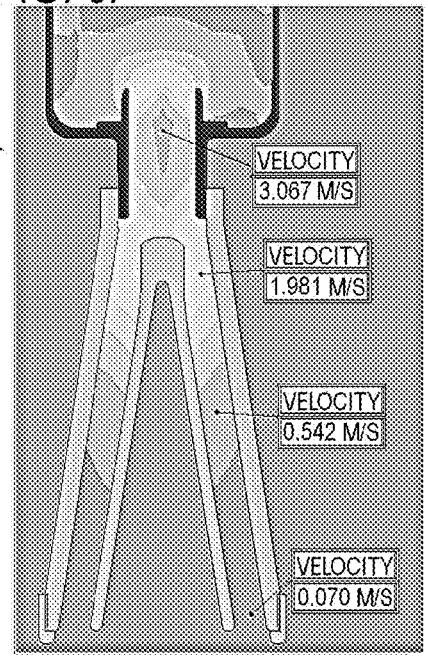

The concepts of the present invention have been bench tested as evidenced in FIG. 5. The test was performed by injection of air into the testing fluid and measuring the turbidity as a higher fluid turbidity measurement is associated with higher aeration. The air injection is shown with the high or spiking turbidity measurements to the left of the graph 70, and thus the more rapid the graph drops from the injection point the greater the de-aeration of the tested system. The base testing 72 was a standard bowl 18 with no additional shroud 30. Second, an in-tank filter bowl 18 with a de-aeration shroud 30 according to FIG. 1 was tested. A third test utilized an in-tank filter bowl 18 with a de-aeration shroud 30 according to FIG. 4 was tested. Having the cylindrical outlet shroud 32 alone was not as effective as the cone diverging member 42 and central deflector 62, although both can be seen to be improvements over the standard bowl 18. The shroud 30 design of the present invention provided superior de-aeration results as shown (the lower most graph). FIGS. 6A and 6B further illustrate the testing shown in graph 70 and are velocity profile schematics of testing on a prior art in-tank filter bowl graphed at 72. Similarly FIGS. 6C and 6D are velocity profile schematics of testing on an in-tank filter bowl 18 with a de-aeration shroud 30 according to FIG. 1 shown at 74 in graph 70; and FIGS. 6E and 6F are velocity profile schematics of testing on an in-tank filter bowl 18 with a de-aeration shroud 30 according to FIG. 4 shown at 76 in graph 70.

In the embodiment of FIG. 7 the cylindrical outlet shroud 30 is somewhat similar to the design of FIG. 2 and further includes a one-way check valve 39 (also called an aeration outlet) at the proximal end 34, while in the embodiment of FIG. 8 the cylindrical outlet shroud 32 includes a circular array of aeration outlets 40 at a proximal end 34 thereof which are surrounded with a gas permeable-liquid impermeable membrane 41. In the embodiments of FIGS. 7-9, the shroud 30 further includes a generally annular passage 50 between the diverging member 42 and the outlet shroud 32 to allow at least gas to flow within the outlet shroud 32 to the proximal end 34 of the outlet shroud 32.

In the embodiment of FIG. 9, the diverging member 42 has a conical shape in cross section, and the distal end 48 of the diverging member 42 is coupled to the outlet shroud 32. Like the embodiment of FIG. 8, the embodiment of FIG. 9 has the cylindrical outlet shroud 32 including a circular array of aeration outlets 40 at a proximal end 34 thereof which are surrounded with a gas permeable-liquid impermeable membrane 41.

In operation of the embodiments of FIGS. 7-9, returning fluid is directed through filter assembly 12 through the top 14, then through the filter element 16 within the bowl 18 and out of the bowl outlet 20 in a generally conventional fashion. The aerated fluid is shown exiting at arrows 52. The increasing area within the diverging member 42 results in a slowing of the fluid allowing for greater removal of air from the fluid through coalescing air bubbles, the path of which is shown generally at arrows 54 in embodiments 2-4. The air will flow upwardly along shroud 30 through the passage 50 to the area at the proximal end 34 of the shroud 32 adjacent the diverging member 42. In the embodiment shown in FIG. 7, the air collecting in the area at the proximal end 34 of the shroud 32 adjacent the diverging member 42 will flow through one way check valve 39 and flow to the surface in the large coalesced bubbles through path 54.

In the embodiments shown in FIGS. 8 and 9, the air collecting in the area at the proximal end 34 of the shroud 32 adjacent the diverging member 42 will flow through aeration outlets 40 and through the gas permeable liquid impermeable membrane 41. The de-aerated fluid shown with arrows 56 will flow through outlet 36 into the reservoir tank 10.

The shrouds 30 according to the present invention may be formed of any material that is suitable for interaction with the fluid in the reservoir 10, although plastic or sheet metal may be most economical. The shroud 30 may be formed as an add-on unit which allows for retrofitting existing reservoirs 10 and filter bowls 18. The shroud 30 may also be integral with the filter bowl and the bowl may be integral with a drop in filter assembly.

Whereas a particular embodiment of this invention has been described above for purposes of illustration, it will be evident to those skilled in the art that numerous variations of the details of the present invention may be made without departing from the invention as defined in the appended claims. The scope of the present invention is intended to be defined by the appended claims and equivalents thereto.

What is claimed is:

1. An in-tank filter bowl de-aeration shroud comprising an outlet shroud surrounding the filter bowl outlet at a proximal end thereof and having a shroud fluid outlet at a distal end thereof with a larger opening than an opening of the filter bowl outlet, wherein the outlet shroud is formed as a diverging member immediately adjacent the filter bowl outlet at a proximal end thereof and diverging from the proximal end to the distal end thereof, further including a central deflector positioned within the diverging outlet shroud and combining with the diverging outlet shroud to form an annular passage to the shroud fluid outlet and wherein the central deflector extends to the filter bowl outlet.

2. The in-tank filter bowl de-aeration shroud according to claim 1 wherein the diverging member has a conical shape in cross section.

3. The in-tank filter bowl de-aeration shroud according to claim 1 wherein the central deflector has a conical shape in cross section.

4. An in-tank filter bowl with de-aeration shroud comprising:
  A filter bowl configured to receive a filter element therein and having an outlet at a distal end thereof; and
  An outlet shroud surrounding the filter bowl outlet at a proximal end thereof and having a shroud fluid outlet at a distal end thereof with a larger opening than an opening of the filter bowl outlet and further including a diverging member within the outlet shroud and surrounding the filter bowl outlet at a proximal end thereof and having a diverging member fluid outlet at a distal end thereof, wherein the member diverges from the proximal to the distal ends thereof.

* * * * *